United States Patent
Kale (10) Patent No.: US 11,741,710 B2
(45) Date of Patent: Aug. 29, 2023

(54) ACCELERATED VIDEO PROCESSING FOR FEATURE RECOGNITION VIA AN ARTIFICIAL NEURAL NETWORK CONFIGURED IN A DATA STORAGE DEVICE

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 181 days.

(21) Appl. No.: 17/077,981

(22) Filed: Oct. 22, 2020

(65) Prior Publication Data

US 2022/0129677 A1    Apr. 28, 2022

(51) Int. Cl.
*G06V 20/40* (2022.01)
*G06N 3/08* (2023.01)

(52) U.S. Cl.
CPC ............... *G06V 20/40* (2022.01); *G06N 3/08* (2013.01)

(58) Field of Classification Search
CPC combination set(s) only.
See application file for complete search history.

(56) References Cited

U.S. PATENT DOCUMENTS

2012/0078894 A1* 3/2012 Jiang ..................... G06F 16/683
                                                               707/723
2017/0124428 A1* 5/2017 Han ........................ G06V 10/82
2018/0173958 A1   6/2018 Hu et al.
2018/0293735 A1* 10/2018 Li ............................ G06T 7/194
2019/0378008 A1* 12/2019 Markram ............... G06N 3/044
2020/0304831 A1* 9/2020 Yang ..................... G06N 20/00

FOREIGN PATENT DOCUMENTS

CN    110738128    1/2020
CN    111767838    10/2020

OTHER PUBLICATIONS

International Search Report and Written Opinion, PCT/US2021/054681, dated Feb. 4, 2022.

* cited by examiner

*Primary Examiner* — Solomon G Bezuayehu
(74) *Attorney, Agent, or Firm* — Greenberg Traurig (57) ABSTRACT

Systems, devices, and methods related to video analysis using an Artificial Neural Network (ANN) are described. For example, a data storage device can be configured to perform the computation of an ANN to recognize or classify features captured in the video images. The recognition or classification results of a prior video frame can be used to accelerate the analysis of the next video frame. The ANN can be organized in layers, where the intermediate result of a current layer can be further analyzed by a next layer for improved accuracy and confidence level. Before or while processing using the next layer, the intermediate result can be compared to the results obtained for the prior frame. If, in view of the results of the prior frame, the confidence level of the intermediate result is boosted to above a threshold, the subsequent layer(s) can be skipped or terminated early.

20 Claims, 5 Drawing Sheets

ACCELERATED VIDEO PROCESSING FOR FEATURE RECOGNITION VIA AN ARTIFICIAL NEURAL NETWORK CONFIGURED IN A DATA STORAGE DEVICE

TECHNICAL FIELD

At least some embodiments disclosed herein relate to memory systems in general, and more particularly, but not limited to memory systems configured for video processing using Artificial Neural Networks (ANNs).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

An Artificial Neural Network (ANN) uses a network of neurons to process inputs to the network and to generate outputs from the network.

Techniques of Artificial Neural Networks have been used in many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a memory sub-system configured with the capability of accelerating the recognition of features captured in video frames or images using an Artificial Neural Network (ANN). Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A video stream typically has a video clip containing multiple frames of images that capture the same set of items/objects. Analyzing individual video frames independently using an Artificial Neural Network can be inefficient.

At least some aspects of the present disclosure address the above and other deficiencies by organizing an Artificial Neural Network in layers and using the combination of the preliminary result from a current layer and the analysis result of the prior frame to decide whether to continue the computation of the next layer. When the analysis result of the prior frame can sufficiently boost the confidence level of the preliminary result of the current layer to above a threshold, the computation of the subsequent layer, configured to refine the analysis and improve confidence level, can be skipped or terminated early. Such early termination can improve allocation and/or usage of resources, such as computing power and energy consumption.

For example, an Artificial Neural Network can be configured in multiple layers, where a current layer of artificial neurons can be used to generate inputs for the next layer. The current layer can generate a preliminary identification and/or classification of an object or feature with an estimated confidence level for the preliminary result. The next layer can perform further analysis to improve the confidence level of the preliminary identification and/or classification.

The result of the recognition/classification performed for the prior frame can be used to assist the confirmation of the preliminary result obtained for the current frame. The similarity of the current frame to the prior frame in the results of the ANN analysis, and/or the lack of dissimilarity, can be used to boost the confidence level of the preliminary result performed for the current frame. When the boosted confidence level is sufficient, the preliminary result can be adopted as the final result; and further computation of the next layer can be stopped to reduce energy consumption, to reallocate the computing power to another task, and/or to cool down the computing device for better thermal management.

For example, a portion of the Artificial Neural Network can be configured to receive, as an input, the classification result from a prior frame and to predict or estimate the boosted confidence level of the preliminary result of the current frame. An output of the portion of the Artificial Neural Network can be configured to provide a control signal that indicates whether the preliminary result can be finalized and/or whether the computation of the next layer can be terminated early without reaching a conclusion.

For example, the next layer of the Artificial Neural Network can be configured to include at least two paths. One of the paths evaluates the boosted confidence level of the preliminary result of the current frame in view of the recognition/classification results of the prior frame; and the other path is configured to refine the recognition/classification of the current frame without relying upon the results from the prior frame. When the boosted confidence level is above a threshold, the computing activities of the other path can be terminated early.

In some implementations, a routine can be programmed to implement a set of rules or an empirical formula and to compute the boosted confidence level of the preliminary result by comparing the preliminary results of the current frame and the recognition/classification results of the prior frame. When the boosted confidence level is below a threshold, the outputs of the current layer can be provided to the next layer for further refinement in the recognition/classification of the current frame; otherwise, the computation of the next layer can be skipped. Alternatively, the computation of the next layer can start before the routine reaches a conclusion; and the conclusion of the routine can be used to terminate the computation of the next layer (or layers) when the boosted confidence level is above the threshold.

Figure 1:
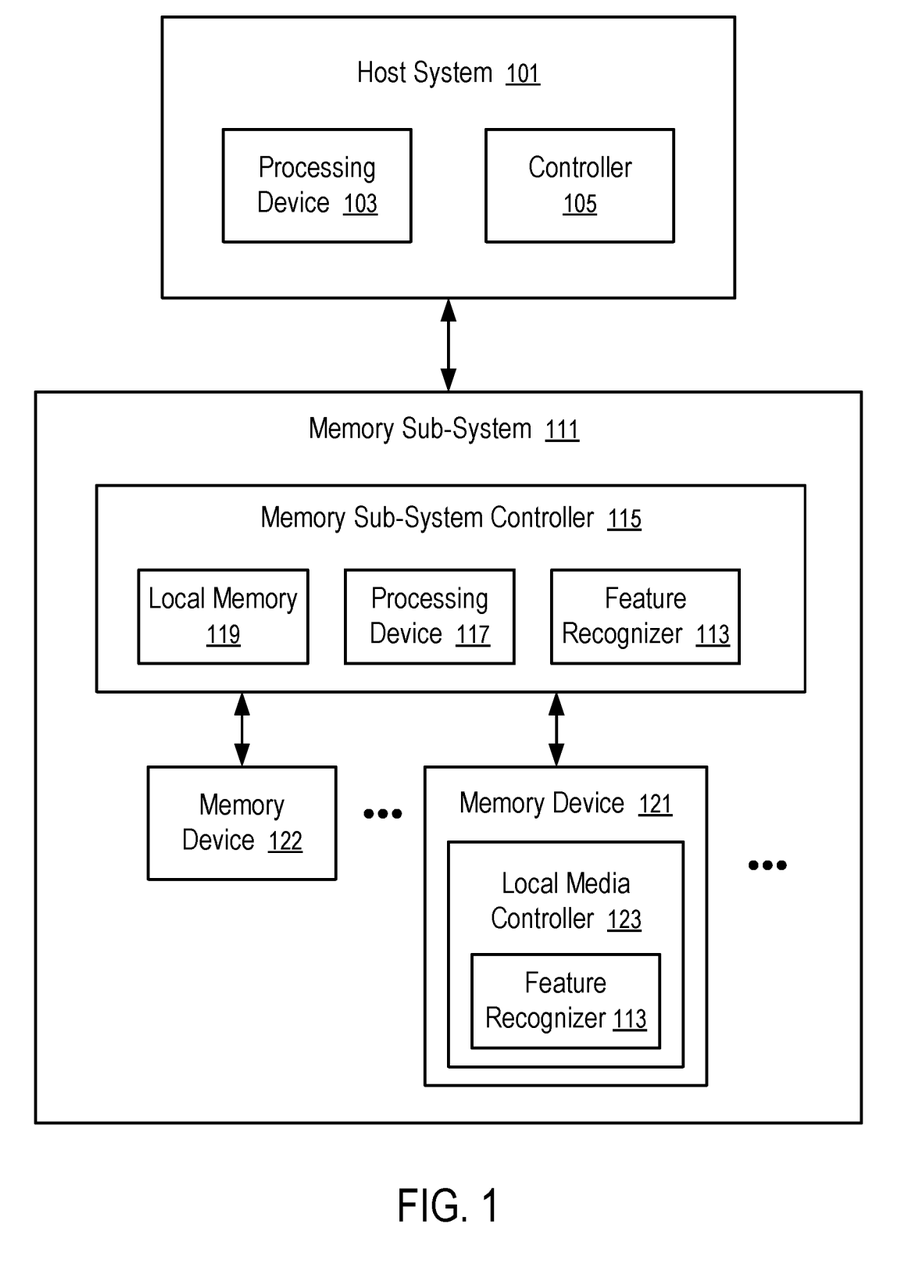
FIG. 1 illustrates an example computing system that includes a memory sub-system in accordance with some embodiments of the present disclosure.

FIG. 1 illustrates an example computing system that includes a memory sub-system (111) in accordance with some embodiments of the present disclosure. The memory sub-system (111) can include media, such as one or more volatile memory devices (e.g., memory device (122)), one or more non-volatile memory (NVM) devices (e.g., memory device (121)), or a combination of such.

The memory sub-system (111) can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system of FIG. 1 can be a computing device such as a desktop computer, a laptop computer, a network server, a mobile device, a vehicle (e.g., airplane, drone, train, automobile, or other conveyance), an Internet of Things (IoT) enabled device, a surveillance camera, an embedded computer (e.g., one included in a vehicle, industrial equipment, or a networked commercial device), or such a computing device that includes memory and a processing device.

The computing system of FIG. 1 can include a host system (101) that is coupled to one or more memory sub-systems (111). FIG. 1 illustrates one example of a host system (101) coupled to one memory sub-system (111). As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system (101) can include a processor chipset (e.g., processing device (103)) and a software stack executed by the processor chipset. The processor chipset can include one or more cores, one or more caches, a memory controller (e.g., controller (105)) (e.g., NVDIMM controller), and a storage protocol controller (e.g., PCIe controller, SATA controller). The host system (101) uses the memory sub-system (111), for example, to write data to the memory sub-system (111) and read data from the memory sub-system (111).

The host system (101) can be coupled to the memory sub-system (111) via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system (101) and the memory sub-system (111). The host system (101) can further utilize an NVM Express (NVMe) interface to access components (e.g., memory devices (121)) when the memory sub-system (111) is coupled with the host system (101) by the PCIe interface. The physical host interface can provide an interface for passing control, address, data, and other signals between the memory sub-system (111) and the host system (101). FIG. 1 illustrates a memory sub-system (111) as an example. In general, the host system (101) can access multiple memory sub-systems via a same communication connection, multiple separate communication connections, and/or a combination of communication connections.

The processing device (103) of the host system (101) can be, for example, a microprocessor, a central processing unit (CPU), a processing core of a processor, an execution unit, etc. In some instances, the controller (105) can be referred to as a memory controller, a memory management unit, and/or an initiator. In one example, the controller (105) controls the communications over a bus coupled between the host system (101) and the memory sub-system (111). In general, the controller (105) can send commands or requests to the memory sub-system (111) for desired access to memory devices (121, 122). The controller (105) can further include interface circuitry to communicate with the memory sub-system (111). The interface circuitry can convert responses received from the memory sub-system (111) into information for the host system (101).

The controller (105) of the host system (101) can communicate with the controller (115) of the memory sub-system (111) to perform operations such as reading data, writing data, or erasing data at the memory devices (121, 122) and other such operations. In some instances, the controller (105) is integrated within the same package of the processing device (103). In other instances, the controller (105) is separate from the package of the processing device (103). The controller (105) and/or the processing device (103) can include hardware such as one or more integrated circuits (ICs) and/or discrete components, a buffer memory, a cache memory, or a combination thereof. The controller (105) and/or the processing device (103) can be a microcontroller, special purpose logic circuitry (e.g., a field programmable gate array (FPGA), an application specific integrated circuit (ASIC), etc.), or another suitable processor.

The memory devices (121, 122) can include any combination of the different types of non-volatile memory components and/or volatile memory components. The volatile memory devices (e.g., memory device (122)) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices (121) can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices (121) can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices (121) can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device (121) can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (or, NOT OR) (NOR) flash memory, and electrically erasable programmable read-only memory (EEPROM).

A memory sub-system controller (115) (or controller (115) for simplicity) can communicate with the memory devices (121) to perform operations such as reading data, writing data, or erasing data at the memory devices (121) and other such operations (e.g., in response to commands scheduled on a command bus by controller (105)). The controller (115) can include hardware such as one or more integrated circuits (ICs) and/or discrete components, a buffer memory, or a combination thereof. The hardware can include digital circuitry with dedicated (i.e., hard-coded) logic to perform the operations described herein. The controller (115) can be a microcontroller, special purpose logic circuitry (e.g., a field programmable gate array (FPGA), an application specific integrated circuit (ASIC), etc.), or another suitable processor.

The controller (115) can include a processing device (117) (e.g., processor) configured to execute instructions stored in a local memory (119). In the illustrated example, the local memory (119) of the controller (115) includes an embedded memory configured to store instructions for performing various processes, operations, logic flows, and routines that control operation of the memory sub-system (111), including handling communications between the memory sub-system (111) and the host system (101).

In some embodiments, the local memory (119) can include memory registers storing memory pointers, fetched data, etc. The local memory (119) can also include read-only memory (ROM) for storing micro-code. While the example memory sub-system (111) in FIG. 1 has been illustrated as including the controller (115), in another embodiment of the present disclosure, a memory sub-system (111) does not include a controller (115), and can instead rely upon external control (e.g., provided by an external host, or by a processor or controller separate from the memory sub-system).

In general, the controller (115) can receive commands or operations from the host system (101) and can convert the commands or operations into instructions or appropriate commands to achieve the desired access to the memory devices (121). The controller (115) can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices (121). The controller (115) can further include host interface circuitry to communicate with the host system (101) via the physical host interface. The host interface circuitry can convert the commands received from the host system into command instructions to access the memory devices (121) as well as convert responses associated with the memory devices (121) into information for the host system (101).

The memory sub-system (111) can also include additional circuitry or components that are not illustrated. In some embodiments, the memory sub-system (111) can include a cache or buffer (e.g., DRAM) and address circuitry (e.g., a row decoder and a column decoder) that can receive an address from the controller (115) and decode the address to access the memory devices (121).

In some embodiments, the memory devices (121) include local media controllers (123) that operate in conjunction with the memory sub-system controller (115) to execute operations on one or more memory cells of the memory devices (121). An external controller (e.g., memory sub-system controller (115)) can externally manage the memory device (121) (e.g., perform media management operations on the memory device (121)). In some embodiments, a memory device (121) is a managed memory device, which is a raw memory device combined with a local controller (e.g., local media controller (123)) for media management within the same memory device package. An example of a managed memory device is a managed NAND (MNAND) device.

The controller (115) and/or a memory device (121) can include a feature recognizer (113) configured to use analysis results of a prior video frame in a video stream to accelerate the analysis of the next video frame. In some embodiments, the controller (115) in the memory sub-system (111) and/or the local media controller (123) includes at least a portion of the feature recognizer (113). In other embodiments, or in combination, the controller (105) and/or the processing device (103) in the host system (101) includes at least a portion of the feature recognizer (113). For example, the controller (115) in the memory sub-system (111), the controller (105) in the host system (101), and/or the processing device (103) of the host system (101) can include logic circuitry implementing the feature recognizer (113). For example, the controller (115) or the processing device (103) (e.g., processor) of the host system (101), can be configured to execute instructions stored in memory for performing the operations of the feature recognizer (113) described herein. In some embodiments, the feature recognizer (113) is implemented in an integrated circuit chip disposed in the memory sub-system (111). In other embodiments, the feature recognizer (113) can be part of firmware of the memory sub-system (111), an operating system of the host system (101), a device driver, or an application, or any combination therein.

For example, the feature recognizer (113) implemented in the computer system of FIG. 1 can use an Artificial Neural Network to recognize and/or classify items/objects captured in a video stream. The Artificial Neural Network is organized in layers where an initial layer of the Artificial Neural Network processes the image of a video frame to generate a preliminary result of recognition/classification; and one or more subsequent layers further refine the results of the initial layer and/or prior layers to improve accuracy in recognition/classification results and their confidence level. The feature recognizer (113) compares a preliminary result generated by the initial layer (or a subsequent layer) with the recognition/classification results obtained for the prior video frame to determine whether the similarity, or the lack of dissimilarity, in classification results of the prior frame and the current frame can boost the confidence level of the preliminary result obtained for the current frame. If the confidence level of the preliminary result is boosted to above a threshold, the computation of the subsequent layer can be skipped or terminated early.

Figure 2:
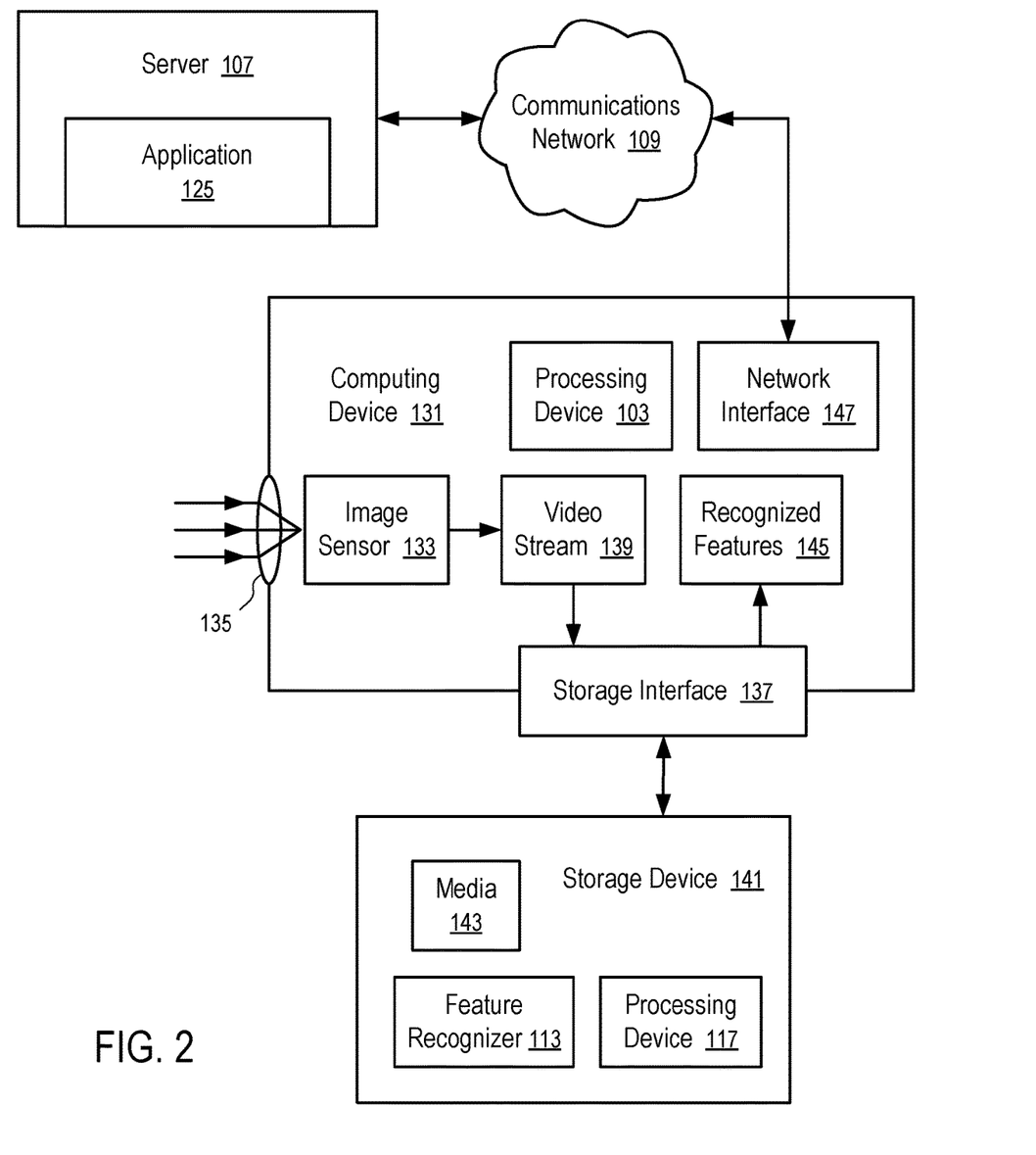
FIG. 2 shows a system configured to use a storage device to recognize features captured in video frames according to one embodiment.

FIG. 2 shows a system configured to use a storage device to recognize features captured in video frames according to one embodiment.

In FIG. 2, a computing device (131) is configured to generate a video stream (139) and store or buffer the video stream into a storage device (141).

For example, the computing device (131) can include an image sensor (133) that captures the video stream (139) of a scene observed through a lens (135).

Alternatively, the video stream (139) can be generated using other sensor technologies, such as a radar, a lidar, an ultrasound scanner, etc.

The computing device (131) is connected to the storage device (141) through a storage interface (137), in a way similar to the host system (101) being connected to the memory sub-system (111) in FIG. 1. For example, the computing device (131) can be an example of a host system (101) of FIG. 1; and the storage device (141) can be an example of a memory sub-system (111) of FIG. 1.

For example, the storage interface (137) can be a memory bus, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface, etc.

The storage device (141) has media (143) to store at least a portion of the video stream (139) and a processing device (117) to process the portion of the video stream (139).

The storage device (141) has a feature recognizer (113) that can be implemented via software, hardware, or a combination of software running in the processing device (117) and/or special purpose hardware, such as an accelerator for Artificial Neural Network computations or matrix computations. Optionally, the feature recognizer (113) can be partially implemented via instructions running in the processing device (103) of a host system (101), such as the computing device (131). For example, the video stream (139) can be analyzed by a feature recognizer in the computing device (131) to determine whether to store or buffer a portion of the video stream into the storage device (141).

The feature recognizer (113) is configured to recognize features, such as items or objects captured in a video frame in the video stream (139). For example, an Artificial Neural Network can be used by the feature recognizer (113) to determine the recognized features (145) in the video frame.

The identifications of the recognized features (145) can be communicated to the computing device (131), and/or to a remote server (107) using a network interface (147) over a communications network (109) to support an application (125).

For example, the application (125) can be a video surveillance application where video clips of interest are uploaded to the server (107) for storage, for viewing remotely (e.g., over the Internet), and/or for the generation of alerts about anomaly and/or security concerns.

For example, the recognized features (145) can be used to determine whether to buffer a video clip in the storage device (141) for a period of time, to upload the video clip to the server (107), and/or to delete the video clip containing the recognized features (145).

In some embodiments, the recognized features (145) can include the identification of one or more unknown item or object that require further analysis by the computing device (131) and/or the server (107).

The feature recognizer (113) is configured to use the identifications of recognized features (145) in a frame to accelerate the identifications of recognized features (145) in a subsequent frame, as further discussed below in connection with FIG. 3.

Figure 3:
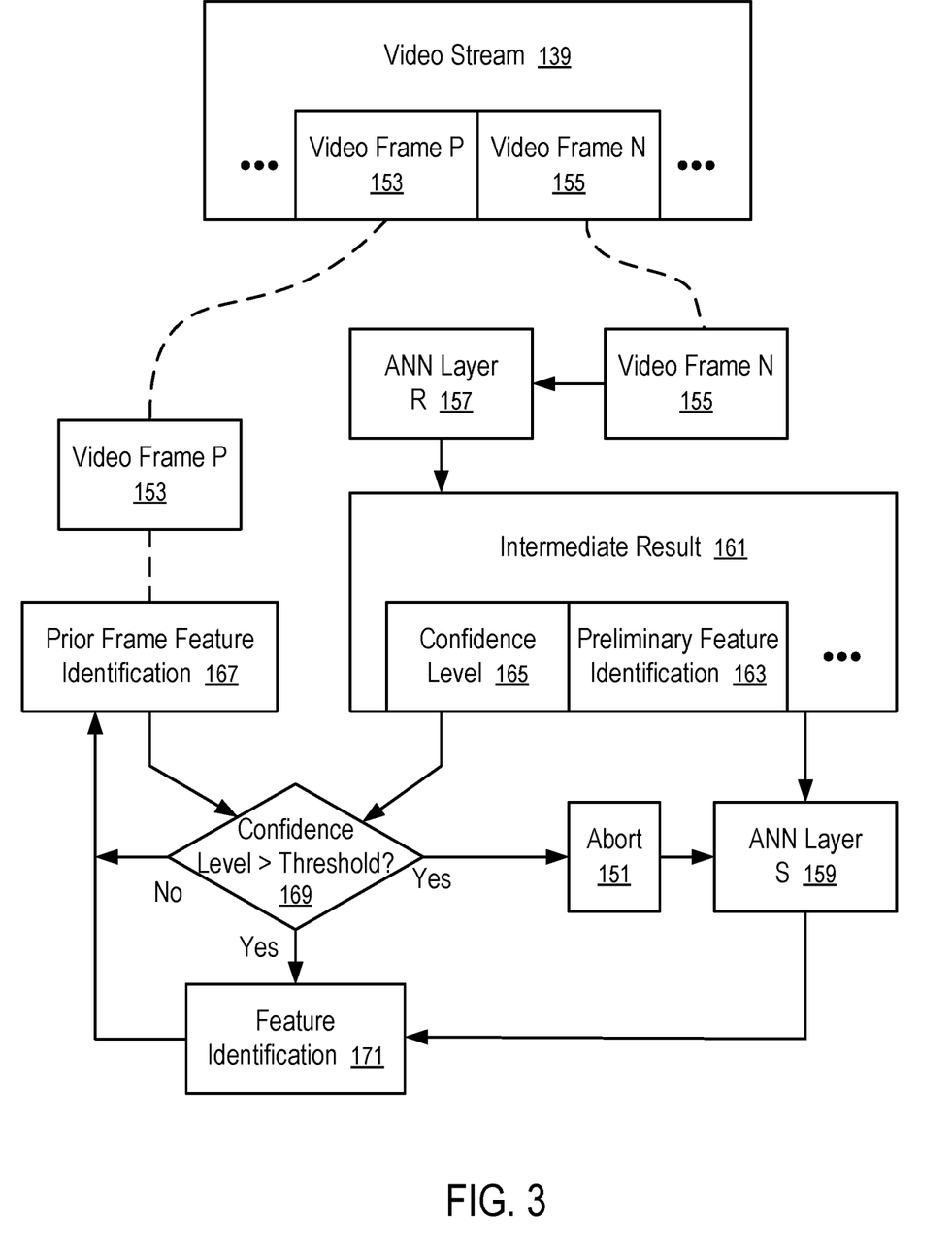
FIG. 3 illustrates a feature recognizer according to one embodiment.

FIG. 3 illustrates a feature recognizer according to one embodiment.

In FIG. 3, a video stream (139) is illustrated to have a video frame P (153) and a subsequent video frame N (155). After the features in the video frame P (153) are identified, the prior frame feature identification (167) generated for the prior video frame P (153) is used for the acceleration of the identification of features in the subsequent video frame N (155).

In FIG. 3, the feature recognizer (113) has an ANN layer R (157) trained to analyze the video frame N (155) to generate an intermediate result (161).

The intermediate result (161) from the ANN layer (157) can include a preliminary feature identification (163) and a confidence level (165) of the preliminary feature identification (163). For example, the preliminary feature identification (163) identifies the features recognized by the ANN Layer R (157) from the video frame (155); and the preliminary feature identification (163) can be generated without using the prior video frame P (153).

The intermediate result (161) is provided as an input to a subsequent ANN layer S (159) for further analysis for the refinement of the intermediate result (161). For example, the subsequent ANN layer S (159) can further determine whether the preliminary feature identification (163) is accurate and whether the confidence level (165) of the preliminary feature identification (163) can be improved to above a threshold.

While the ANN layer S (159) is used to further analyze the intermediate result (161), the feature recognizer (113) compares the prior frame feature identification (167) of the prior video frame P (153) with the preliminary feature identification (163) of the current video frame (155). The feature recognizer (113) makes a determination (169) of whether the confidence level (165) of the intermediate result (161) is improved via the similarity between the prior frame feature identification (167) and the preliminary feature identification (163) to above a threshold. If so, the preliminary feature identification (163) from the intermediate result (161) can be accepted as the feature identification (171) for the video frame (155) and saved as the prior frame feature identification (167) for the analysis of the video frame that follows the video frame N (155). Further, the feature recognizer (113) can abort (151) the computation of the ANN layer S (159).

If the prior frame feature identification (167) is insufficient to boost the confidence level (165) of the intermediate result (161) to above the threshold, such a determination (169) prevents the feature recognizer (113) from aborting the computation of the ANN layer S (159). Upon completion of the computation of the ANN layer S (159), the feature recognizer (113) obtains the feature identification (171) in the output of the ANN layer S (159), which can be saved as the prior frame feature identification (167) for the analysis of a further video frame that follows the video frame N (155).

Optionally, the computation of the ANN layer S (159) is configured to start after the determination (169) is that the confidence level (165) has been boosted to above the threshold in view of the prior frame feature identification (167).

Optionally, the ANN layer S (159) can be further divided into multiple layers, where the confidence level in the intermediate result of a layer can be boosted via the prior frame feature identification (167) to abort the computation of the next layer, in a way similarly to the confidence level (165) of the intermediate result (161) being boosted by the prior frame feature identification (167) to control and/or terminate the computation of the ANN layer S (159) illustrated in FIG. 3.

Figure 4:
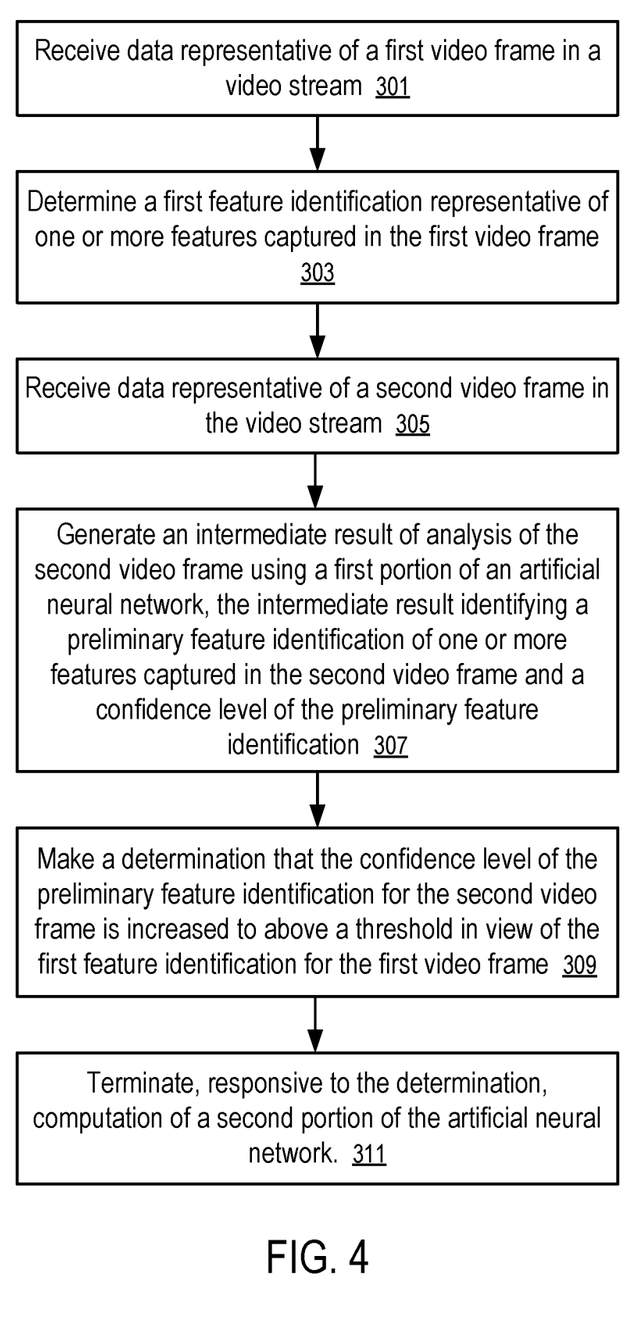
FIG. 4 shows a method of video analysis according to one embodiment.

FIG. 4 shows a method of video analysis according to one embodiment. For example, the method of FIG. 4 can be implemented in a system of FIG. 1 or 2 with a feature recognizer (113) configured according to FIG. 3.

At block 301, the feature recognizer (113) receives data representative of a first video frame (e.g., 153) in a video stream (139).

At block 303, the feature recognizer (113) determines a first feature identification representative of one or more features captured in the first video frame (e.g., 153). For example, the first feature identification can be stored as a prior frame feature identification (167) illustrated in FIG. 3.

At block 305, the feature recognizer (113) receives data representative of a second video frame (e.g., 155) in the video stream (139).

At block 307, the feature recognizer (113) generates an intermediate result (161) of analysis of the second video frame (e.g., 155) using a first portion of an artificial neural network. For example, the first portion of the artificial neural network can be the ANN layer R (157) illustrated in FIG. 3; and the intermediate result (e.g., 161) identifies a preliminary feature identification (e.g., 163) of one or more features captured in the second video frame (e.g., 155) and a confidence level (165) of the preliminary feature identification (163).

At block 309, the feature recognizer (113) makes a determination (169) that the confidence level (165) of the preliminary feature identification (163) for the second video frame (e.g., 155) can be increased to above a threshold in view of the first feature identification for the first video frame (153).

At block 311, the feature recognizer (113) terminates or skips, responsive to the determination (169), the computation of a second portion of the artificial neural network. For example, the second portion of the artificial neural network can be the ANN layer S (159) illustrated in FIG. 3. The ANN layer S (159) can be configured to further analyze the intermediate result (161) to improve accuracy and/or increase confidence level of feature identification (e.g., 163) obtained from the second video frame (e.g., 155).

For example, when the prior frame feature identification (167) boosts the confidence level (165) of the preliminary feature identification (163) to above a threshold, the feature recognizer (113) can send a signal to abort (151) the computation of the ANN layer S (159) for the second video frame (e.g., 155) and thus terminates its computation early, before the ANN layer S (159) generates an output that contains a feature identification.

The feature recognizer (113) can be implemented in a storage device (141) illustrated in FIG. 2 or in a memory sub-system (111) illustrated in FIG. 1.

The feature recognizer (113) of the storage device (141) performs feature recognition in response to a host system (e.g., 101 or 131) writing the video frames (e.g., 153, 155) of the video stream (139) into the media (143) of the storage device (141). The results generated by the feature recognizer (113), such as data identifying recognized features (145), can be transmitted to the host system (e.g., 101 or 131) and/or a remote server (107) for a video-based application (125), such as video storage, surveillance, remove viewing, security alert, etc.

Optionally, the determination (e.g., 169) can be performed using a portion of the artificial neural network that receives the preliminary feature identification (163) and the first feature identification (e.g., 167) as an input. For example, in a training period, the portion of the artificial neural network predicts whether the boosted confidence level is above the threshold, and the ANN layer S (159) generates an output indicative of whether the preliminary feature identification (163) can be increased to above the threshold level. A supervised machine learning technique can be used to train the portion of the artificial neural network to minimize the difference between the prediction generated by the portion of the artificial neural network and the output of the ANN layer S (159). After the training, the prediction of the portion of the artificial neural network can be used to selectively abort the computation of the ANN layer S (159).

Alternatively, the determination (e.g., 169) can be performed using an empirical formula without using artificial neurons.

For example, the feature recognizer (113) can compare the preliminary feature identification (163) of the current video frame (155) and the first feature identification (e.g., 167) of the prior video frame (153) to determine a level of similarity. Then, the feature recognizer (113) can determine a boosted confidence level of the preliminary feature identification (163) based on the level of similarity. The determination (169) can be performed based on whether the boosted confidence level is above a threshold.

For example, the boosted confidence level can be calculated using an empirical formula or using a portion of the artificial neural network implemented in the data storage device (141).

Figure 5:
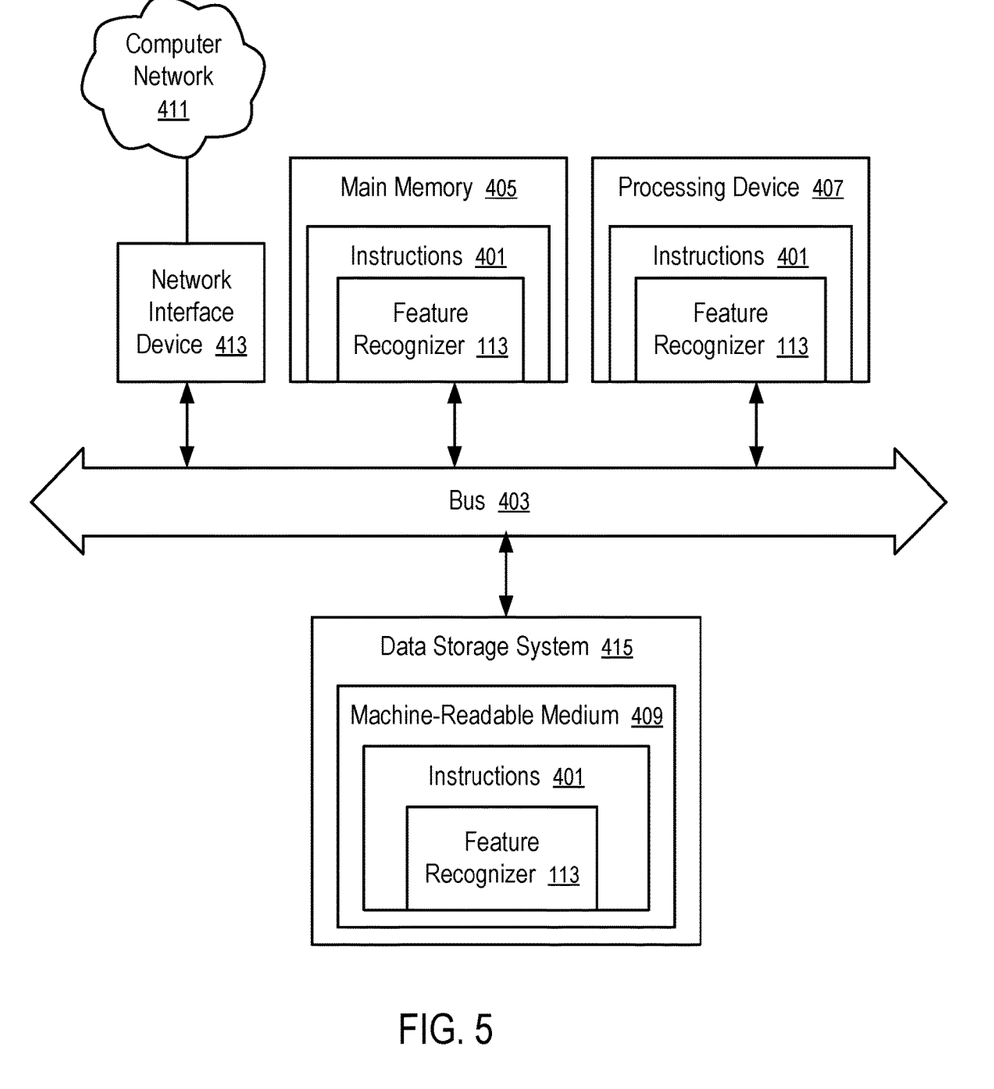
FIG. 5 shows a block diagram of an example computer system in which embodiments of the present disclosure can operate.

FIG. 5 illustrates an example machine of a computer system within which a set of instructions, for causing the machine to perform any one or more of the methodologies discussed herein, can be executed. For example, the methodologies discussed in connection with FIG. 5 can be implemented via the set of instruction.

In some embodiments, the computer system of FIG. 5 can implement a system of FIG. 1 or 2 with a feature recognizer (113) as discussed in connection with FIGS. 1, 2, 3 and/or 4.

The computer system of FIG. 5 can be used to perform the operations of a feature recognizer (113) described with reference to FIGS. 1-5 by executing instructions configured to perform the operations corresponding to the feature recognizer (113).

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a surveillance camera, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 5 includes a processing device (407), a main memory (405), and a data storage system (415), which communicate with each other via a bus (403). For example, the processing device (407) can include one or more microprocessors; the main memory (405) can include read-only memory (ROM), flash memory, dynamic random access memory (DRAM), such as synchronous DRAM (SDRAM) or Rambus DRAM (RDRAM), static random access memory (SRAM), etc. The bus (403) can include, or be replaced with, multiple buses.

The processing device (407) in FIG. 5 can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Alternatively, or in combination, the processing device (407) can include one or more special-purpose processing devices such as an application specific integrated circuit (ASIC), a field programmable gate array (FPGA), a digital signal processor (DSP), a network processor, or the like. The processing device (407) is configured to execute instructions (401) for performing the operations discussed in connection with the feature recognizer (113).

The computer system of FIG. 5 can further include a network interface device (413) to communicate over a computer network (411).

The data storage system (415) can include a machine-readable medium (409) (also known as a computer-readable medium) on which is stored one or more sets of instructions (401) or software embodying any one or more of the methodologies or functions described herein. The instructions (401) can also reside, completely or at least partially, within the main memory (405) and/or within the processing device (407) during execution thereof by the computer system, the main memory (405) and the processing device (407) also constituting machine-readable storage media.

In one embodiment, the instructions (401) include instructions to implement functionality corresponding to a feature recognizer (113), such as the feature recognizer (113) described with reference to FIGS. 1-5. While the machine-readable medium (409) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
  receiving first data representative of a first video frame in a video stream;
  determining from the first data a first feature identification representative of one or more features captured in the first video frame;
  receiving second data representative of a second video frame in the video stream;
  generating an intermediate result of analysis of the second data using a first portion of an artificial neural network, the intermediate result identifying a preliminary feature identification of one or more features captured in the second video frame and a confidence level of the preliminary feature identification;
  making a determination that the confidence level of the preliminary feature identification for the second video frame is above a threshold based at least in part on the first feature identification for the first video frame; and
  terminating, responsive to the determination, computation of a second portion of the artificial neural network.

2. The method of claim 1, further comprising:
  performing, in a data storage device, computation of the first portion of an artificial neural network to generate the intermediate result; and
  performing, in the data storage device, the computation of the second portion of the artificial neural network using the intermediate result as an input to improve the intermediate result.

3. The method of claim 2, further comprising:
  receiving, in the data storage device, data representative of the video stream being written into the data storage device;
  wherein the first feature identification is determined in response to the first data representative of the first video frame being written into the data storage device; and
  wherein the intermediate result of analysis is determined in response to the second data representative of the second video frame being written into the data storage device following the first data representative of the first video frame being written into the data storage device.

4. The method of claim 3, further comprising:
  transmitting, responsive to the determination that the confidence level of the preliminary feature identification for the second video frame is above the threshold in view of the first feature identification for the first video frame, the preliminary feature identification as an output of the artificial neural network.

5. The method of claim 4, wherein the output of the artificial neural network is transmitted to a host device that writes the data representative of the video stream to the data storage device.

6. The method of claim 4, further comprising:
  storing, responsive to the determination, the preliminary feature identification as a second feature identification determined for the second video frame; and
  deciding, based on the second feature identification, early termination of the second portion of the artificial neural network in analysis of a third video frame that follows the second video frame in the video stream.

7. The method of claim 4, wherein the making of the determination comprises an analysis performed by a portion of the artificial neural network using the preliminary feature identification and the first feature identification as an input.

8. The method of claim 4, wherein the making of the determination is performed without using artificial neurons.

9. The method of claim 4, further comprising:
comparing the preliminary feature identification and the first feature identification to determine a level of similarity; and
determining a boosted confidence level of the preliminary feature identification based on the level of similarity, wherein the determination is based on the boosted confidence level.

10. The method of claim 9, wherein the boosted confidence level is determined based on an empirical formula.

11. A memory device, comprising:
an interface connectable to a host device to receive data representative of a video stream written by the host device to the memory device;
memory configured to store the data representative of the video stream; and
at least one processing device configured to:
determine a first feature identification representative of one or more features captured in a first video frame in the video stream;
generate an intermediate result of analysis of a second video frame following the first video frame in the video stream using a first portion of an artificial neural network, the intermediate result including a preliminary feature identification of one or more features captured in the second video frame and a confidence level of the preliminary feature identification;
make a determination that the confidence level of the preliminary feature identification for the second video frame is increased to above a threshold in view of the first feature identification for the first video frame; and
terminate or skip, responsive to the determination, computation of a second portion of the artificial neural network.

12. The memory device of claim 11, wherein the at least one processing device is configured to store the preliminary feature identification as a second feature identification and use the second feature identification to determine whether to terminate computation of the second portion of the artificial neural network in an analysis of a third video frame in the video stream, before the second portion of the artificial neural network outputs a feature identification for the third video frame.

13. The memory device of claim 11, wherein the artificial neural network includes a portion configured to receive the preliminary feature identification and the first feature identification to determine whether to terminate or skip the computation of the second portion of the artificial neural network.

14. The memory device of claim 11, wherein the at least one processing device is configured to compare the preliminary feature identification and the first feature identification, determine a similarity level of the preliminary feature identification and the first feature identification, and make the determination based on the similarity level and the confidence level of the preliminary feature identification.

15. The memory device of claim 14, wherein the at least one processing device is configured to calculate a boosted confidence level of the preliminary feature identification based at least in part on the similarity level using an empirical formula.

16. A non-transitory computer storage medium storing instructions which, when executed in a computing device, cause the computing device to perform a method, the method comprising:
determining a first feature identification representative of one or more features captured in a first video frame in a video stream;
generating an intermediate result of analysis of a second video frame following the first video frame in the video stream using a first portion of an artificial neural network, the intermediate result including a preliminary feature identification of one or more features captured in the second video frame and a confidence level of the preliminary feature identification;
making a determination that the confidence level of the preliminary feature identification for the second video frame is increased to above a threshold in view of the first feature identification for the first video frame; and
terminating or skipping, responsive to the determination, computation of a second portion of the artificial neural network.

17. The non-transitory computer storage medium of claim 16, wherein the method further comprises:
storing the preliminary feature identification as a second feature identification;
determining, using the second feature identification, determine whether to terminate computation of the second portion of the artificial neural network in analyzing a third video frame in the video stream, before the second portion of the artificial neural network outputs a feature identification for the third video.

18. The non-transitory computer storage medium of claim 16, wherein the artificial neural network includes a portion configured to receive the preliminary feature identification and the first feature identification to determine whether to terminate or skip the computation of the second portion of the artificial neural network.

19. The non-transitory computer storage medium of claim 16, wherein the method further comprises:
comparing the preliminary feature identification and the first feature identification;
determining a similarity level of the preliminary feature identification and the first feature identification; and
deciding, based on the similarity level and the confidence level of the preliminary feature identification, whether to terminate or skip the computation of the second portion of the artificial neural network.

20. The non-transitory computer storage medium of claim 19, wherein the method further comprises:
calculating a boosted confidence level of the preliminary feature identification based at least in part on the similarity level using an empirical formula.

* * * * *